(12) United States Patent
Pearce et al.

(10) Patent No.: US 10,200,071 B1
(45) Date of Patent: Feb. 5, 2019

(54) SYSTEM AND METHOD FOR INTERFERENCE REDUCTION IN RADIO COMMUNICATIONS

(71) Applicant: Kratos Integral Holdings, LLC, San Diego, CA (US)

(72) Inventors: Stephen Pearce, Fremont, CA (US); Robert Potter, Los Altos, CA (US)

(73) Assignee: KRATOS INTEGRAL HOLDINGS, LLC, San Diego, CA (US)

( * ) Notice: Subject to any disclaimer, the term of this patent is extended or adjusted under 35 U.S.C. 154(b) by 0 days.

(21) Appl. No.: 15/670,996

(22) Filed: Aug. 7, 2017

(51) Int. Cl.
  *H04B 1/04* (2006.01)
  *H04B 1/10* (2006.01)
  *H04L 25/02* (2006.01)
  *H04L 27/01* (2006.01)

(52) U.S. Cl.
  CPC ....... *H04B 1/1027* (2013.01); *H04L 25/0204* (2013.01); *H04L 25/0262* (2013.01); *H04L 27/01* (2013.01)

(58) Field of Classification Search
  CPC ........ H04B 1/123; H04B 7/002; H04B 1/109; H04B 1/1036; H04B 7/1851; H04B 7/18513; H04B 17/345; H04L 1/06; H04L 25/0204; H04L 25/03038; H04L 27/2647;
  (Continued)

(56) References Cited

U.S. PATENT DOCUMENTS 4,099,121 A    7/1978   Fang
5,771,984 A *   6/1998   Potter ................. E21B 7/14
                                                  175/14
(Continued)

FOREIGN PATENT DOCUMENTS

EP       3097673 A1   11/2016
JP   2015-530836 A   10/2015
(Continued)

OTHER PUBLICATIONS

A World Leader in Satellite Interference Detection and Carrier Monitoring Systems, SAT Corporation, SatMagazine, May 2008.
(Continued)

*Primary Examiner* — James M Perez
(74) *Attorney, Agent, or Firm* — Procopio, Cory, Hargreaves & Savitch LLP

(57) ABSTRACT

This disclosure provides a system and method for separating a first signal from a second signal of a plurality of constituent signals within a composite signal. The method can include receiving a first portion of the composite signal at a first clock rate and exponentiating it to detect the first signal and the second signal within the composite signal and determine modulation estimates of the first and second signals and at least one symbol rate. The method can also include resampling the first portion based on the modulation estimates at x-times the at least one symbol rate to determine symbol trajectory, modulation type, and offset information between the first signal and the second signal. The method can include determining a synthesized first signal and a synthesized second signal representing the first signal and the second signal within the first period of time at a second clock rate that is a multiple of the first clock rate.

20 Claims, 8 Drawing Sheets

(58) Field of Classification Search
CPC ..... H04L 2025/03414; H04L 25/03057; H04L 27/0012
USPC .................................................. 375/316–352
See application file for complete search history.

(56) References Cited

U.S. PATENT DOCUMENTS

| | | | | |
|---|---|---|---|---|
| 6,430,391 | B1* | 8/2002 | Dent | H04B 7/18513 |
| | | | | 370/315 |
| 6,775,334 | B1* | 8/2004 | Liu | H04B 1/68 |
| | | | | 348/E11.002 |
| 7,031,370 | B1* | 4/2006 | Fukumasa | H04B 1/707 |
| | | | | 375/141 |
| 7,639,761 | B2* | 12/2009 | Chu | H04B 1/1027 |
| | | | | 375/230 |
| 8,433,015 | B2* | 4/2013 | Downey | H04J 11/004 |
| | | | | 375/285 |
| 9,026,042 | B1 | 5/2015 | Nemeth et al. | |
| 9,130,624 | B2* | 9/2015 | Daughtridge | H04B 1/0475 |
| 9,219,631 | B2* | 12/2015 | Potter | H04B 1/0475 |
| 9,331,681 | B2* | 5/2016 | Midha | H03K 3/84 |
| 9,577,936 | B2* | 2/2017 | Asiano | H04L 47/12 |
| 9,793,906 | B1* | 10/2017 | Midha | H03L 7/083 |
| 9,923,566 | B1* | 3/2018 | Kumar | H03C 3/095 |
| 9,967,021 | B2* | 5/2018 | Potter | H04B 7/18513 |
| 2003/0016770 | A1* | 1/2003 | Trans | H04B 1/00 |
| | | | | 375/346 |
| 2003/0174675 | A1* | 9/2003 | Willenegger | H04B 7/022 |
| | | | | 370/335 |
| 2005/0111347 | A1* | 5/2005 | Breiling | H04B 7/0669 |
| | | | | 370/206 |
| 2006/0067446 | A1* | 3/2006 | Maeda | H04B 1/1027 |
| | | | | 375/349 |
| 2006/0121946 | A1* | 6/2006 | Walton | H04B 7/0417 |
| | | | | 455/561 |
| 2006/0182203 | A1* | 8/2006 | Miller | H04B 7/04 |
| | | | | 375/340 |
| 2006/0203941 | A1* | 9/2006 | Borran | H04L 1/0003 |
| | | | | 375/340 |
| 2006/0208786 | A1* | 9/2006 | Pliquett | H04L 7/027 |
| | | | | 327/354 |
| 2006/0291599 | A1 | 12/2006 | Strodtbeck et al. | |
| 2007/0020622 | A1* | 1/2007 | Lee | C12N 9/1252 |
| | | | | 435/6.11 |
| 2007/0091873 | A1* | 4/2007 | LeBlanc | H04B 3/23 |
| | | | | 370/352 |
| 2007/0110132 | A1* | 5/2007 | Guess | H04B 1/7107 |
| | | | | 375/148 |
| 2007/0263742 | A1* | 11/2007 | Schmidt | H04L 7/027 |
| | | | | 375/262 |
| 2008/0130714 | A1* | 6/2008 | Wilborn | H04B 1/71075 |
| | | | | 375/144 |
| 2009/0028222 | A1* | 1/2009 | Shnaider | H04B 1/7103 |
| | | | | 375/148 |
| 2009/0122928 | A1* | 5/2009 | Twitto | H04L 25/0212 |
| | | | | 375/344 |
| 2009/0154620 | A1* | 6/2009 | Mostafa | H04B 17/345 |
| | | | | 375/346 |
| 2009/0175465 | A1* | 7/2009 | Kwon | H04B 1/1027 |
| | | | | 381/93 |
| 2010/0111237 | A1* | 5/2010 | Fanson | H04B 1/1036 |
| | | | | 375/346 |
| 2010/0302439 | A1* | 12/2010 | Le | H04N 9/67 |
| | | | | 348/453 |
| 2011/0135043 | A1* | 6/2011 | Downey | H04J 11/004 |
| | | | | 375/346 |
| 2011/0268168 | A1* | 11/2011 | Dybdal | H04L 25/03171 |
| | | | | 375/225 |
| 2012/0076220 | A1* | 3/2012 | Kimura | H04L 25/03343 |
| | | | | 375/260 |
| 2012/0094332 | A1* | 4/2012 | Lee | C12N 9/1252 |
| | | | | 435/91.2 |
| 2012/0214524 | A1* | 8/2012 | Wajcer | H04B 1/109 |
| | | | | 455/502 |
| 2013/0077661 | A1* | 3/2013 | Jacobsen | H04W 72/0473 |
| | | | | 375/219 |
| 2013/0170534 | A1* | 7/2013 | Weisman | H04L 25/03318 |
| | | | | 375/229 |
| 2013/0294494 | A1* | 11/2013 | Wang | H04B 1/71055 |
| | | | | 375/233 |
| 2013/0315346 | A1* | 11/2013 | Varma | H04L 7/0008 |
| | | | | 375/316 |
| 2014/0086359 | A1* | 3/2014 | Daughtridge | H04B 1/0475 |
| | | | | 375/296 |
| 2015/0123721 | A1* | 5/2015 | Midha | H03K 3/84 |
| | | | | 327/164 |
| 2015/0131761 | A1* | 5/2015 | Potter | H04B 1/0475 |
| | | | | 375/340 |
| 2016/0108381 | A1* | 4/2016 | Lee | C12N 9/1252 |
| | | | | 435/91.2 |
| 2018/0019799 | A1* | 1/2018 | Potter | H04B 7/18513 |
| 2018/0062661 | A1* | 3/2018 | Kumar | H03C 3/095 |
| 2018/0145695 | A1* | 5/2018 | Lahiri | H03L 7/1976 |

FOREIGN PATENT DOCUMENTS

| | | |
|---|---|---|
| WO | 0163777 A2 | 8/2001 |
| WO | 03077488 A1 | 9/2003 |
| WO | 2008053414 A1 | 5/2008 |
| WO | 2014047470 A1 | 3/2014 |

OTHER PUBLICATIONS

Digital Spectrum Analysis for Interference Detection and Analysis, SAT Corporation, Aug. 2005.
International Search Report and Written Opinion for related PCT application No. PCT/US2013/060980, dated Feb. 7, 2014, in 9 pages.
International Search Report and Written Opinion for related PCT application No. PCT/US2015/012509, dated Oct. 6, 2015, in 10 pages.
Potter. Reducing Interference in Satellite Communication, SAT Corporation. Jul. 2008.
International Search Report and Written Opinion for related PCT Application No. PCT/US2017/042132, dated Oct. 5, 2017, in 16 pages.
Giridhar et al. "Nonlinear Techniques for the Joint Estimation of Cochannel Signals." IEEE Transactions on Communications. vol. 45, No. 4, Apr. 1, 1997.
Office Action for corresponding JP Patent Application No. 2016-544545, dated Sep. 11, 2018 in 5 pages.
International Search Report and Written Opinion for related PCT Application No. PCT/US2018/041996, dated Oct. 17, 2018, in 20 pages.
International Search Report and Written Opinion for related PCT Application No. PCT/US2018/044321, dated Oct. 25, 2018, in 14 pages.
Waldow, "Maximizing Ka-Band Network Uptime by Ground Station Diversity-Via Satellite." Via Satellite. Oct. 12, 2015. Retrieved from http://interactive.satellitetoday.com/maximixing-ka-band-network-uptime-by-ground-station-diversity on Oct. 9, 2018.

* cited by examiner

SYSTEM AND METHOD FOR INTERFERENCE REDUCTION IN RADIO COMMUNICATIONS

BACKGROUND

Technological Field

This disclosure relates to relates to interference reduction and signal separation in radio communication. More specifically, this disclosure relates to methods and systems for radio frequency (RF) signal characterization, interference reduction, blind signal separation, and signal modulation and demodulation in satellite communications.

Related Art

With the demand for fast and reliable RF communications and the ever increasing amount of information contained in such RF communications, it is important to use the available frequencies and RF spectra as efficiently as possible. However, the available frequencies are crowded with information and are often subject to significant interference.

Interference between various RF signals can be reduced by separating them as possible in time, space, or frequency. In some cases, such separation can also reduce or otherwise limit the amount of information that can be transmitted between a transmitter and a receiver over the available bandwidth. This can lead to diminished efficiency in data transmissions over a given communication system.

SUMMARY

In general, this disclosure describes systems and methods related to interference reduction and signal protection in radio communications. The systems, methods and devices of this disclosure each have several innovative aspects, no single one of which is solely responsible for the desirable attributes disclosed herein.

One aspect of the disclosure provides a method for separating a first signal from a second signal of a plurality of constituent signals within a composite signal. The method can include receiving, at a first clock rate, a first portion of the composite signal spanning a first period of time. The method can include exponentiating the first portion to detect the first signal and the second signal within the composite signal and determine a first modulation estimate of the first signal, a second modulation estimate of the second signal, and at least one symbol rate. The method can include resampling the first portion based on the first modulation estimate and the second modulation estimate at x-times the at least one symbol rate to determine at least one symbol trajectory, at least one modulation type, and offset information between the first signal and the second signal, x being an integer greater than zero. The method can include determining a synthesized first signal and a synthesized second signal representing the first signal and the second signal within the first period of time at a second clock rate, the second clock rate being a multiple of the first clock rate.

Another aspect of the disclosure provides a device for separating a first signal from a second signal of a plurality of constituent signals within a composite signal. The device can have a receiver operable to receive, at a first clock rate, a first portion of the composite signal spanning a first period of time. The device can have one or more processors coupled to the receiver. The one or more processors can exponentiate the first portion to detect the first signal and the second signal within the composite signal. The one or more processors can determine a first modulation estimate of the first signal, a second modulation estimate of the second signal, and at least one symbol rate. The device can have a regenerator modem disposed off-chip. The device in conjunction with the one or more processors can resample the first portion based on the first modulation estimate and the second modulation estimate at x-times the at least one symbol rate to determine at least one symbol trajectory, at least one modulation type, and offset information between the first signal and the second signal, x being an integer greater than zero. The device in conjunction with the one or more processors can determine a synthesized first signal and a synthesized second signal representing the first signal and the second signal within the first period of time at a second clock rate, the second clock rate being a multiple of the first clock rate.

Another aspect of the disclosure provides an apparatus for separating a first signal from a second signal of a plurality of constituent signals within a composite signal. The apparatus can have means for receiving, at a first clock rate, a first portion of the composite signal spanning a first period of time. The apparatus can have means for exponentiating the first portion to detect the first signal and the second signal within the composite signal and determine a first modulation estimate of the first signal, a second modulation estimate of the second signal, and at least one symbol rate. The apparatus can have means for resampling the first portion based on the first modulation estimate and the second modulation estimate at x-times the at least one symbol rate to determine at least one symbol trajectory, at least one modulation type, and offset information between the first signal and the second signal, x being an integer greater than zero. The apparatus can have means for determining a synthesized first signal and a synthesized second signal representing the first signal and the second signal within the first period of time at a second clock rate, the second clock rate being a multiple of the first clock rate.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

The details of embodiments of the present invention, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Separating signals in frequency or physical distance to minimize or reduce interference may decrease the amount of information that can be transmitted via a given communication channel or medium. If an interfering signal is received from an unknown or hostile source, separating signals in these ways may not be possible as little or no information about the interfering signal may be available.

Further, if the interfering signal is from an unknown or hostile source, when little or no information about the signal is known, separating signals in these ways may not be possible. Thus, reuse of bandwidth over multiple signals or overlapping transmitted signals in frequency may provide efficient use of available frequency spectra.

In some embodiments disclosed herein, certain demodulation techniques may have applications in multiple different communications systems including, but not limited to satellite communications signals and satellite command and control (C2) links, unmanned aerial vehicle (UAV) line of sight (LOS) and satellite data links, shipboard microwave and satellite communications systems, microwave communications links, GPS receivers, cellular phone communications links, cable signals, and other point-to-point or point-to-multi-point radio frequency (RF) systems that are susceptible to accidental or intentional interference. The methods and systems disclosed herein can also be used to allow blind dual-carrier signal processing to provide increased capacity for significantly higher data rates over a satellite transponder or other fixed RF bandwidth link than single carrier transmission.

Figure 1:
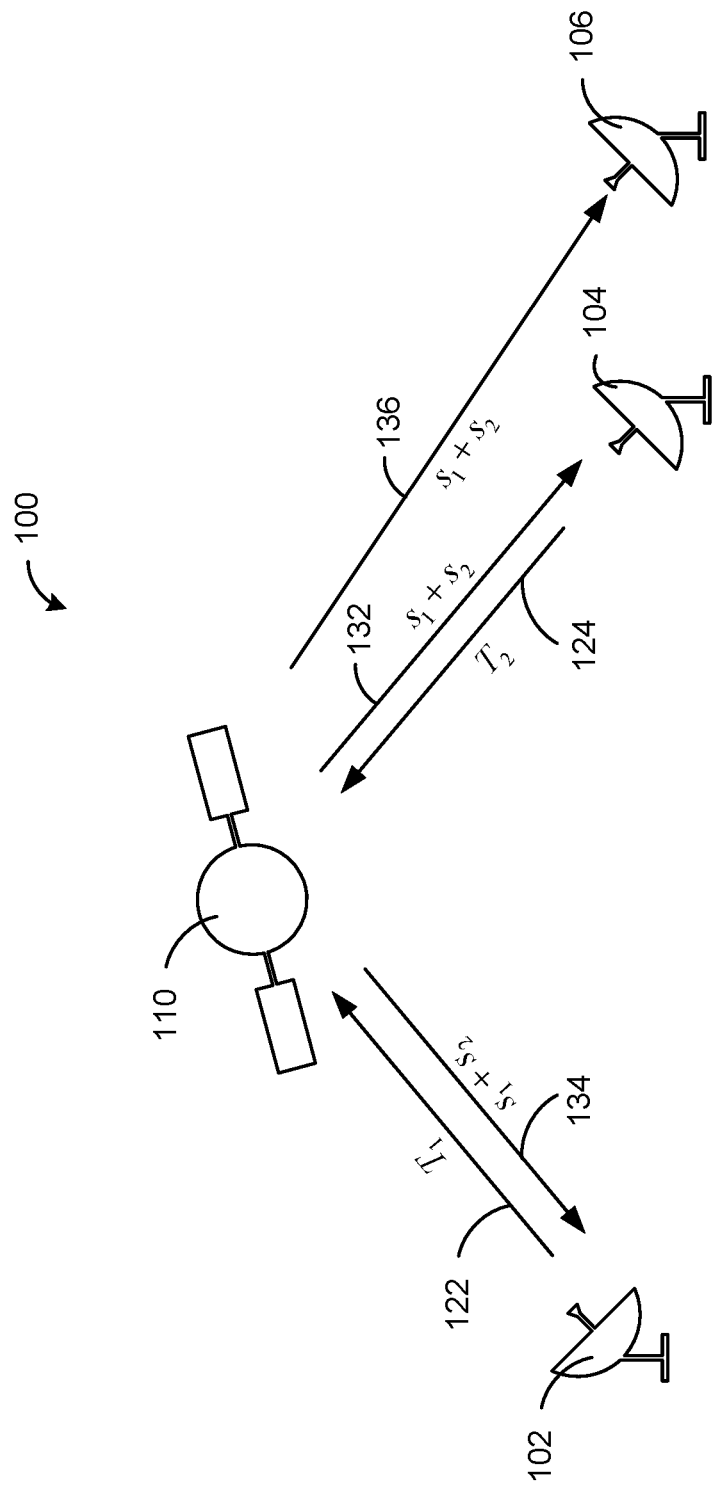
FIG. 1 is graphical depiction of an embodiment of satellite communications between a plurality of ground stations.

FIG. 1 is graphical depiction of an embodiment of satellite communications between a plurality of ground stations. A communication system ("system") 100 depicts a plurality of ground stations 102, 104, 106 communicating with one another via a satellite 110. In some embodiments, the communication system 100 may comprise more than three ground stations 102, 104, 106 and more than one satellite 110.

Some systems may depend upon local copies of the outgoing signals for echo cancelation for interference reduction. In some systems a balanced approach to point-to-point or point-to-multipoint satellite communications may require certain signal processing at both ends of a communications link (e.g., a transmitter-receiver pair). In other systems another, an unbalanced approach may require signal processing only at one site. The communication system 100 of FIG. 1 is an example of an unbalanced approach in which the ground station 106, for example, does not have a local copy of transmitted signals, as described below.

The ground station 102 may transmit a signal 122 (T1) to the satellite 110 that is then relayed to the ground stations 104, 106. The ground station 104 may transmit a signal 124 (T2) to the satellite 110 that is relayed to the ground station 102 and the ground station 106. The ground station 102 may receive the signal 124 (T2) and an echo of its own transmitted signal 122 (T1) as a composite signal 134 (shown as, S1+S2). Similarly, the ground station 104 may receive the signal 122 (T1) and an echo of its own transmitted signal 124 (T2) as a composite signal 132 (shown as, S1+S2). As used in FIG. 1, the "T" indicates a transmitted signal while the "S" indicates a corresponding signal received at one or more of the ground stations 102, 104, 106. The "S1" and "S2" may also refer to constituent signals of a composite signal (e.g., the composite signals 132, 134, 136).

In some embodiments, both of the ground stations 102, 104 may have a local copy of the transmitted signals 122, 124 to use in echo cancellation. In some cases, the removal of the self-interfering transmitted signal is accomplished using a process such as echo cancellation. In such an embodiment, the "echo" may be provided by sampling the transmit signal 122, 124, processing this signal through a delay line (not shown), matching phase and gain of the incoming composite signal 132, 134 and cancelling the transmitted signal within the downlink signal to extract the additional signal within the processed frequency space. The echo cancelation may provide certain levels of interference reduction within the communication system 100 such that they may be able to receive and successfully demodulate the signal 122 and the signal 124 respectively.

The ground station 106 on the other hand does not transmit a signal of its own and thus may not have any significant echo cancelation capabilities for reception and processing of the signal 122 (S1) and the signal 124 (S2). The signal 122 (S1) and the signal 124 (S2) together, as received by the ground station 106, is designated composite signal 136. The composite signal 136 may be similar to the composite signal 132 and the composite signal 134, being a combination of two signals, S1+S2. In some embodiments, either or both of the signal 122 and the signal 124 can be signals of interest for the ground station 106.

The composite signal 136 may however be subject to different forms and levels of interference due to different operating environments. In some embodiments the composite signals 132, 134, 136 may further include varying amounts of interference in addition to echo interference. In other embodiments, the one or more signals 122, 124 found within the composite signals 132, 134, 136 may also be referred to herein as constituent signals. Thus, for example, the signal 122 and the signal 124 may be referred to as constituent signals of the composite signal 136. Two modulated signals transmitted together may also be considered an additional modulation.

In some embodiments, a signal of interest (e.g., the signal 122 and/or the signal 124) can be canceled from the composite signal 136, for example, leaving a noise floor. The noise floor as used herein may generally refer to the measure of the signal created or regenerated from the sum of all the noise sources and unwanted signals within a measurement system, where noise is defined as any signal other than the signal or signals being monitored. The noise floor can describe a residual signal or remaining noise after the signal of interest (e.g., the signal 122, 124) is removed from the composite signal 136. The noise floor can then be characterized using the interference mitigation or the interference removal methods described herein (described below in connection with FIG. 6) to create a canceling signal.

In some embodiments, the noise floor may not be characterized. Accordingly, the canceling signal that has been created can be combined in a feed-forward loop with a copy of the composite signal, while compensating for frequency and amplitude variations, to reduce the noise floor. This may result in a higher signal-to-noise (SNR) ratio for the signal of interest. This can increase the potential data throughput of the signal by allowing the use of higher-order modulation schemes, and thus increase the throughput of the entire satellite 110.

In some embodiments, in order to maximize the use of the available frequency spectra, the signal 122 and the signal 124 may use the same or similar bandwidth. In some embodiments, the signal 122 and the signal 124 may have the same amplitude. In some other embodiments, the signal 122 and the signal 124 may differ slightly in one or more of bandwidth, phase, and amplitude. Accordingly, the ground stations 102, 104 may accidentally or intentionally utilize similar frequencies, bandwidths, and power levels (e.g., amplitude) to transmit their respective signals (T1, T2) for example, the signal 122 and the signal 124. Thus, the ground station 106 may receive the signal 122 and the signal 124 having a significant or complete frequency overlap between the received signals. In some embodiments, there may be more than two overlapped signals, as described below in connection with FIG. 7A, FIG. 7B, and FIG. 7C. The overlap of two or more signals of interest may present the ground station 106 with certain problems requiring separation and parsing of overlapped and possibly interfering signals, for example the signal 122, and the signal 124.

Modulation as described herein may include, but not be limited to analog or digital modulation. Some of the modulation schemes referenced herein can include but not be limited to quadrature amplitude modulation (QAM), phase shift keying (PSK), binary PSK (BPSK), quadrature PSK (QPSK), differential PSK (DPSK), differential QPSK (DQPSK), amplitude and phase shift keying (APSK), offset QPSK (OQPSK), amplitude shift keying (ASK), minimum-shift keying (MSK), Gaussian MSK (GMSK) among other types of modulation, time division multiple access (TDMA), code division multiple access (CDMA), orthogonal frequency division multiple access (OFDMA), and continuous phase modulation (CPM). Certain modulation types such as for example QAM and APSK may also differ in modulus, for example, 4QAM, 8QAM, and 16APSK, to name a few.

Figure 2:
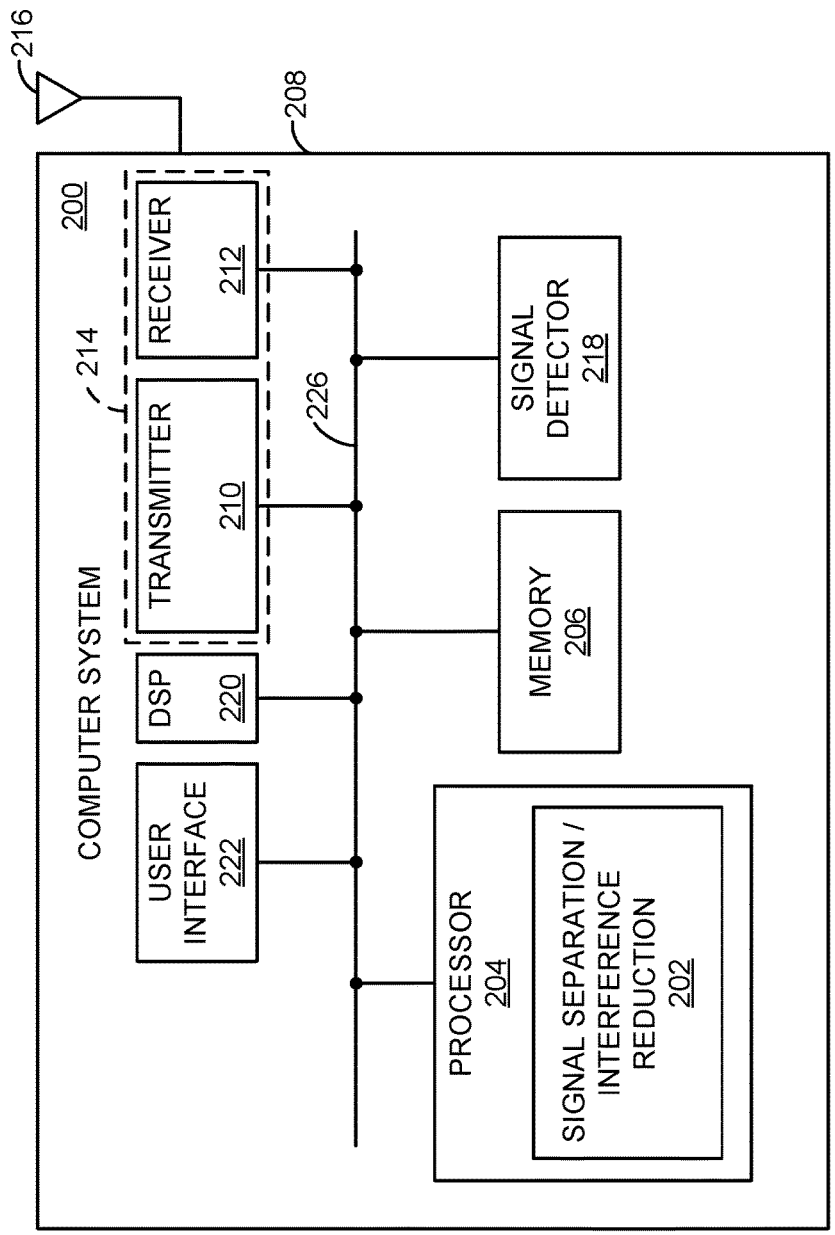
FIG. 2 is a functional block diagram of components of a communication device that may be employed within the communication system of FIG. 1.

FIG. 2 is a functional block diagram of components of a communication device that may be employed within the communication system of FIG. 1. As shown, communication device 200 may be implemented as the ground stations of FIG. 1. For example the communication device 200 may comprise the ground station 106.

The communication device ("device") 200 may include a processor 204 which controls operation of the communication device 200. The processor 204 may also be referred to as a central processing unit (CPU). The communication device 200 may further include a memory 206 operably connected to the processor 204, which may include both read-only memory (ROM) and random access memory (RAM), providing instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the communication device 200 is implemented or used as a receiving node or ground station, the processor 204 may be configured to process information from of a plurality of different signal types. In such an embodiment, the communication device 200 may be implemented as the ground station 106 and configured to receive and parse or separate the composite signal 136 into its constituent signals (e.g., the signal 122 and the signal 124). For example, the processor 204 may be configured to determine the frequency, bandwidth, modulation type, shaping factor, and symbol trajectory, among other transmission characteristics in order to recreate or regenerate the signals 122, 124. The processor 204 may implement various processes or methods in certain signal separation and interference reduction modules ("modules") 202 to effect such determinations. The modules 202 may also include the adaptive regenerative technology (ART) described in connection with FIG. 3, below.

The processor 204 may further include one or more adaptive equalizers (not shown). The adaptive equalizers may be configured to estimate and characterize incoming signals in the time domain.

The processor 204 may comprise or be a component of a processing system implemented with one or more processors 204. The one or more processors 204 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processor 204 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors 204, cause the processing system to perform the various functions described herein.

The communication device 200 may also include a housing 208 that may include a transmitter 210 and a receiver 212 to allow transmission and reception of data between the communication device 200 and a remote location. For example, such communications may occur between the ground stations 102, 104, 106. The transmitter 210 and receiver 212 may be combined into a transceiver 214. An antenna 216 may be attached to the housing 208 and electrically coupled to the transceiver 214, or to the transmitter 210 and the receiver 212 independently. The communication device 200 may also include (not shown) multiple transmitters, multiple receivers, multiple transceivers, and/or multiple antennas.

The communication device 200 may also include a signal detector 218 that may be used in an effort to detect and quantify the level of signals received by the transceiver 214. The signal detector 218 may detect such signal characteristics as frequency, bandwidth, symbol rate, total energy, energy per symbol, power spectral density and other signal characteristics. The signal detector 218 may also be include a "windowing module," (described in FIG. 3) and may further be configured to process incoming data (e.g., one or more signals 122, 124) ensuring that the processor 204 is receiving a correct bandwidth-limited portion of a wireless communication spectrum in use. As a non-limiting example, certain transmissions to and from a ground station 102, 104 can incur certain time and frequency variations by the time the transmissions are received at the satellite 110 and rerouted to the ground station 106. Such variations may be due to Doppler shift and distance traveled, among other factors. Accordingly, the signal detector 218 (or windowing module) may correct the incoming signal(s) 136 for bandwidth and center frequency to ensure the processor 204 received the correct portion of the spectrum including the signal(s) 122, 124, 136.

The communication device 200 may also include a digital signal processor (DSP) 220 for use in processing signals. The DSP 220 may be configured to generate a data unit for transmission. The DSP 220 may further cooperate with the signal detector 218 and the processor 204 to determine certain characteristics of the composite signal 136.

The communication device 200 may further comprise a user interface 222 in some aspects. The user interface 222 may comprise a keypad, a microphone, a speaker, and/or a display. The user interface 222 may include any element or component that conveys information to a user of the communication device 200 and/or receives input from the user.

The various components of the communication device 200 described herein may be coupled together by a bus system 226. The bus system 226 may include a data bus, for example, as well as a power bus, a control signal bus, and a status signal bus in addition to the data bus. Those of skill in the art will appreciate the components of the communication device 200 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

Figure 3:
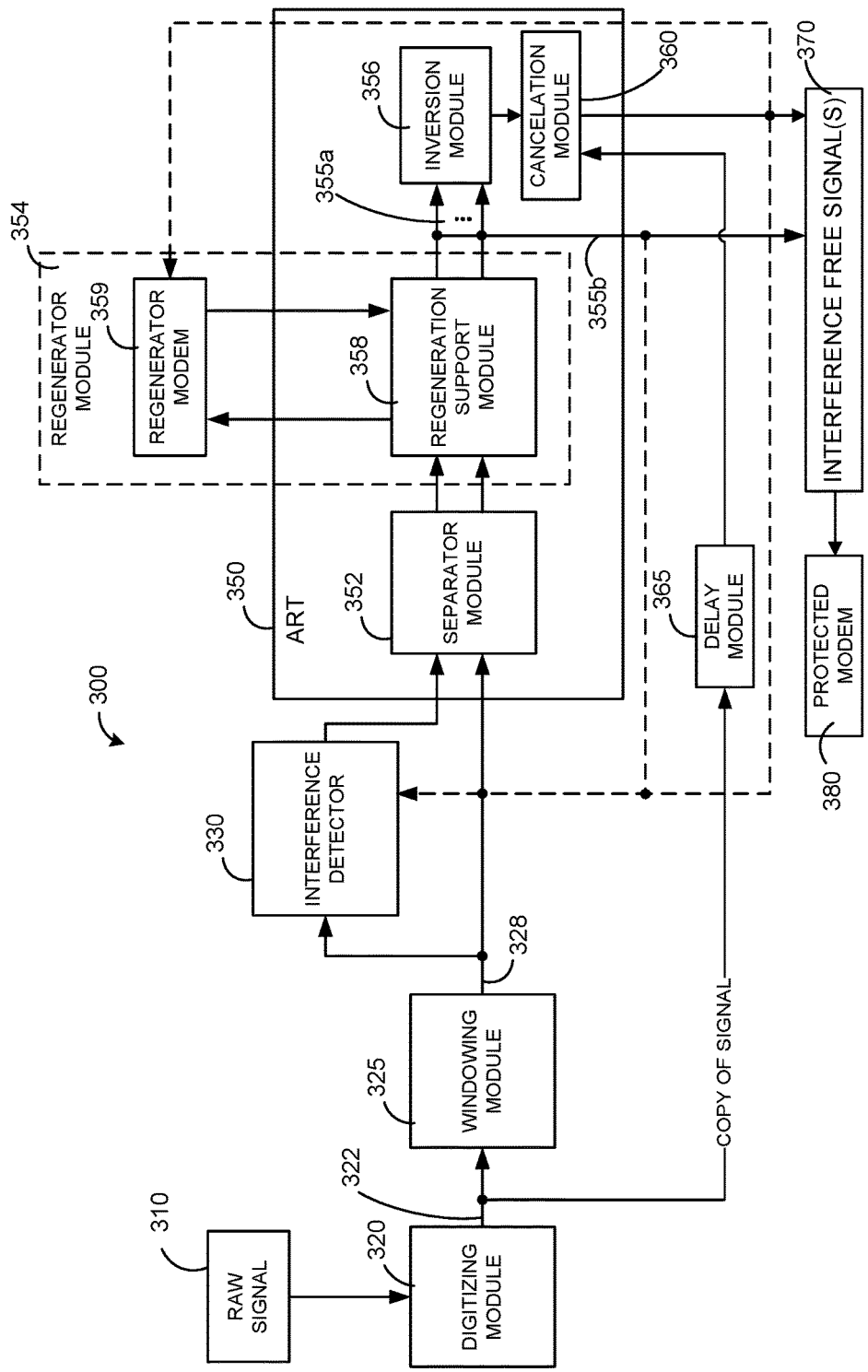
FIG. 3 is a functional block diagram of a signal demodulator.

FIG. 3 is a functional block diagram of a signal demodulator ("demodulator"). A demodulator 300 can receive a raw signal 310 a portion of which can include one or more signals of interest. For example, the ground station 106 may receive the raw signal 310 including the composite signal 136, which, as noted above, can have multiple constituent signals 122, 124. The raw signal 310 may comprise an entire spectrum or spectra of frequencies in use for wireless communications (e.g., satellite communications).

The raw signal 310 is received by the receiver 212 (FIG. 2) and processed by a digitizing module 320. The digitizing module 320 can comprise one or more analog to digital (A2D) converters for translating the raw signal 310 from an analog signal to a digital signal. The digitizing module 320 can output a digitized signal 322.

The demodulator 300 can further have a windowing module 325 operably coupled to the digitizing module 320. As noted above, the windowing module 325 can be a component of the signal detector 218. The windowing module 325 can also cooperate with the processor 204 and the DSP 220 to complete the processes described herein.

In some embodiments, the windowing module 325 can be configured to limit the bandwidth of (e.g., band-limit) the digitized signal 322 or focus on a portion of the digitized signal 322 to ensure the demodulator 300 processes the desired portion of the spectrum encompassing the signal(s) of interest. In some embodiments, the desired portion of the spectrum may contain the one or more signals of interest (e.g., the signal 122 and the signal 124). The windowing module 325 can also correct the bandwidth-limited portion of the spectrum for center frequency and bandwidth such that the signal(s) of interest (e.g., the composite signal 136 and the signals 122, 124) are processed by the demodulator 300. For purposes of the following description, the bandwidth limited portion of the digitized signal 322 limited by the windowing module 325 may generally be referred to herein as a windowed signal 328. In some embodiments, the windowed signal 328 may be a digital form of the composite signal 136 containing multiple constituent signals (e.g., the signal 122 and the signal 124). One or more of the constituent signals can be the signal(s) of interest.

The demodulator 300 can further include an interference detector 330. In some embodiments, the interference detector 330 can be configured to receive the windowed signal 328 and determine the presence of the signal 122 and the signal 124, or the composite signal 136, in addition to other interfering signals. In some embodiments, two or more signals that are themselves individually modulated (e.g., QPSK, 4QAM, 16APSK, etc.) may further be considered a modulation when propagated together as the composite signal 136.

The interference detector 330 can process incoming windowed signal 325 in the time domain to determine the presence of multiple interfering signals (e.g., the signal 122 and the signal 124). The interference detector 330 can also process the windowed signal 328 in the frequency domain. In some embodiments, the interference detector 330 can analyze the Fourier transform of the modulus of the windowed signal 328 to determine the presence of multiple constituent signals. In some other embodiments, the processes conducted by the interference detector 330 can be implemented in software.

The interference detector 330 may use processes in both frequency and time to determine at least a modulation estimate and estimates of a symbol rate or clock rate. In some embodiments, the modulation estimate may be derived by multiplying the windowed signal 328 by itself n-times until a continuous wave (CW) is the product of the windowed signal 328 raised to a power of n. As used herein, the operation of multiplying a signal by itself, or raising a signal to a power of n is generally referred to as "exponentiation." Exponentiation of the windowed signal 328 can be completed multiple times to determine the presence of multiple constituent signals in the time domain and the frequency domain. Accordingly, the windowed signal 328 may be multiplied by itself until the interference detector 330 (or signal detector 218) determines there are one, two, or more signals present in the windowed signal 328. Each of the constituent signals (e.g., the signal 122 and the signal 124) may have a different modulation and thus produce a CW product at different powers of n. For example, exponentiation of a composite signal 136 having three constituent signals with three different modulation types can produce three separate CW waveforms at three different powers of n. In another example, two or more of the constituent signals can have the same modulation and thus the CW waveforms would result at the same value of n. In some embodiments, the power of n is a multiple of two.

The interference detector 330 can further derive a symbol rate estimate through the exponentiation function of the windowed signal 328. In some embodiments, when the signal is multiplied by itself a number of times, the phase of the symbols may correlate or cancel, resulting in a CW product indicated by a single frequency in the frequency domain. This process may also yield small side lobes, (e.g., "side spurs") that are evenly spaced (e.g., in the frequency domain) about the CW frequency. The spacing of the side lobes is related to the symbol rate for the carrier of the corresponding constituent signal and may be used to estimate the symbol rate. The interference detector 330 can further have one or more adaptive equalizers (not shown) configured to use the exponentiation product(s) and the spacing of the "side spurs" to further refine the one or more symbol rate estimates to derive one or more actual symbol rates corresponding to the constituent signals. In some embodiments, such adaptive equalizers can run at a multiple of the symbol rate estimate(s) to derive actual symbol rates. In some embodiments, this process may be completed for each distinct value of n (e.g., power of n). The one or more actual symbol rates can correspond to the one or more constituent signals present in the windowed signal 328. For example, if the composite signal has three exemplary constituent signals with three different symbol rates (as above), three separate symbol rates can be derived by the interference detector 330. In an embodiment, two or more constituent signals may be present having the same symbol rate. In another embodiment, the two or more constituent signals (e.g. the signal 122 and the signal 124) can have the same symbol rates but different modulation.

The demodulator 300 can further include one or more adaptive regenerators ("ART") 350. The acronym "ART" as used herein stands for Adaptive Regenerative Technology" and can generally refer to the processors comprising the ART 350. The ART 350 of FIG. 3 may have multiple subcomponents or modules. When one or more signals (e.g., signals of interest and interfering signals) are detected by the interference detector 330, the windowed signal 328 may pass to a separator module 352 within the ART 350.

The separator module 352 may resample the windowed signal 328 using the modulation estimate (from the interference detector 330) at X-times the symbol rate. In some embodiments, the windowed signal 328 can be resampled at X-times the symbol rate for each symbol rate detected by the interference detector 330, similar to the interference detector 330. Thus the separator module 352 can sample the incoming constituent signal(s) at a high rate and derive a symbol trajectory, shaping factor, and a more accurate estimate of the modulation type of each of the constituent signals present in the windowed signal 328. The separator module 352 can also determine the constituent signals' frequency and bandwidth, and a phase offset between each of the constituent signals (e.g., the signals 122, 124) within the windowed signal 328. As used herein, shaping factor may generally refer to concentration or distribution of signal energy of a given constituent signal (e.g., the signal 122 or the signal 124). In some embodiments, the shaping factor may be a root-raised cosine spectra of the windowed signal 328. Shaping factor may be used when referring to the frequency domain of the windowed signal 328 while "pulse shaping" may be used to refer to the time domain of the windowed signal 328.

The ART 350 can further have a regenerator module 354 operably coupled to the separator module 352. The regenerator module 354 can use the symbol trajectory, coupled with the shaping factor, modulation, and phase offset of the constituent signals to regenerate, or synthesize, each of the constituent signals (e.g., the signals 122, 124). The regenerator module 354 may use the bandwidth, frequency offset, and amplitude in the synthesis, or regeneration, of each of the constituent signals, as regenerated signal 355. The regenerated signal 355 can represent multiple signals (as indicated with an ellipsis), that is, the regenerated or synthesized versions of each of the constituent signals 122, 124, for example. The regenerated signal(s) 355 are labeled 355a, 355b indicating the multiple possible paths of signal processing. In some embodiments the synthesis of each of the regenerated signals 355 may be completed simultaneously or at least concurrently.

In an embodiment, the regenerator module 354 can have a regeneration support module 358. The regeneration support module 358 can receive the data related to signal regeneration from the separator module 352 (e.g., the symbol trajectory, coupled with the shaping factor, modulation, and phase offset). The regeneration support module 358 can further control transmission of such signal regeneration data, and the windowed signal 328, as needed, to and from a regenerator modem 359 and on to other portions of the demodulator 300.

In some embodiments, the regenerator modem 359 can be located apart from the rest of the demodulator 300, but communicatively coupled to the regeneration support module 358. The regenerator modem 359 can be located off-chip, for example. The demodulator 300 and the regenerator modem 359 can be implemented in complementary electronics, but on separate components. For example, the majority of the demodulator 300 can be on an FPGA, while the regenerator modem 359 is external of that FPGA but functions as a part of the regenerator module 354. The regenerator modem 359 can thus be included in, for example, a separate ASIC, another FPGA, a fixed function FPGA, or a discrete or standalone modem.

In some embodiments, certain waveforms such as the DVB-S2X (digital video broadcasting-satellite) may a have dynamic formats and require dedicated demodulator/modulators designed and built by a specific manufacturer. Rather than build a modem from generic components within an FPGA for application with satellite waveforms, implementing a third party device (either via a dedicated chip or FPGA module) in the FPGA of a separate chip/board provides increased flexibility to adapt the demodulator 300 for use with nearly any signal waveform.

The regenerator modem 359 can be a modem associated with a vendor-specific satellite communications radio, such as a protected modem 380. The configuration of the regenerator modem 359 may be specific to a user, a specific range of frequencies, or a particular use associated with the protected modem 380. Accordingly, the physical and operational characteristics of the regenerator modem 359 can vary according to the protected modem 380. Thus, there may be certain advantages or efficiencies realized by configuring the demodulator 300 to operate with a specific protected modem 380.

In some systems, a particular interference cancelation process can, for example, synthesize a first signal, having the signal having the highest signal strength. In such a process, the regenerator module 354 may use a power separation between high and low power signals to regenerate a high power signal in the first stage then use successive regeneration stages to synthesize the low(er) power signal(s). This first (high power) signal can be canceled or reduced from the original signal (e.g., the raw signal 310) forming a residual signal (e.g., the raw signal 310 minus the first signal). The interference reduction process can be repeated on the residual signal to remove a signal with the next-highest signal strength and/or refine the signal quality of one or more demodulated or synthesized signals. This process can be iterated several times to further refine the signal(s) of interest. Such iterations can require additional space on integrated circuits to accommodate multiple FGPAs, for example, to accomplish the sequential, or serial, processing. Alternatively, processing time may be increased significantly if the same circuitry is tasked with the multiple iterations.

The regenerator modem 359 can receive the information regarding the constituent signals or the signal(s) of interest derived by the separator module 352 via the regeneration support module 358. In some embodiments, the regenerator modem 359 can support faster processing than the ART 350, for example. This may be referred to herein as "faster than real time," where "real time" is relative to the processing time required to synthesize signals within the ART 350. In some examples, the ART 350 can receive or "consume" signal data at a first data rate. The regenerator modem 359 on the other hand can process the signal data at a second rate that is a multiple of the first rate.

In at least one embodiment, the regeneration support module 358 can receive, or "consume", data at a first data rate (e.g., 50 MHz, 100 MHz, or 300 MHz). The regenerator modem 359 can process such data at a second data rate that is significantly faster than the first data rate, or a multiple of the first data rate (e.g., 500 MHz). The multiple can be a factor of 2, 3, 4, 5, 6, 7, 8, 9, 10, or more, or any value in between. In some other embodiments, the processing may be faster still. For example, the ART 350 may consume the data at the first rate of 300 MHz while the regenerator modem 359 can process the signal data at the second rate of, for example, 3 GHz.

The faster processing provided by the regenerator modem 359 can allow the ART 350 to demodulate and (re)modulate, or synthesize, the various signals of interest (or interfering signals) faster than the data is received (e.g., consumed) at the regenerator module 354 (e.g., the regeneration modem 359). This can allow multiple iterations or loops of signal processing (e.g., modulation, demodulation, signal regeneration) within the regenerator module 354 before further processing. In some embodiments, the separated aspect of the regenerator modem 359 from the rest of the ART 350 can simplify the circuit design, while increasing processing speed and efficiency. For example, the multiple iterations of modulation/demodulation within the regenerator module 354 may alleviate the need to repeatedly iterate the process to remove multiple signals of interest from the raw signal 310.

Another possible advantage of such a configuration allows a specific demodulator 300 to operate with different regenerator modems 359, and therefore different protected modems 380. Certain manufacturers may be motivated to collaborate because increased performance may be realized from the signal cancellation methods disclosed herein when the demodulator 300 implements exactly what the protected modem 380 implements, including forward error correction (FEC) and other data processing methods. For example, FEC can be implemented to correct errors in a link, or otherwise improve link gain. Some waveforms, such as DVB-S2X, can implement FEC link gain as part of the link calculation. Such waveforms can have dynamic FEC, meaning that as the link margins change, FEC rates can also adjust.

In some embodiments, if the regenerated signal 355a is one of the constituent signals (e.g., the signal 122 and the signal 124), the processor 204 may determine which of the constituent signals is/are a desired signal and protect or otherwise isolate and focus on the desired signal (e.g., the signal 122). The regenerator module 354 can pass one or more regenerated signals 355 on to the inversion module 356. The regenerated signal 355a can be inverted within the inversion module 356 and subsequently canceled from the raw signal 310. Similarly, the regenerated signal 355b can be supplied back to the interference detector 330 or the separator module 352 depending on the nature of the regenerated signal 355b for additional processing for more refined versions of the regenerated signals 355.

For example, if the signal 122 and the signal 124 are constituent signals of the windowed signal 328, the processor may select the signal 122 (e.g., the regenerated signal 355a) as the desired signal and output an "interference free" version of the signal 122. The "interference free" version can have a reduced or negligible interfering signal strength. In some embodiments, the signal of interest (e.g., the signal 122) can be used to further characterize the noise floor of the composite signal 136. The noise floor can then be canceled to increase the SNR of the signal of interest (e.g., the signal 122). The various feedback loops from the regenerator module 354 and the cancelation module 360 allow one or more of the signals of interest, interfering signals, noise floor, etc. to be used to refine the signals of interest.

If the regenerated signal(s) 355a is/are not the signals of interest, they may be used for interference cancelation. The ART 350 can further have an inversion module 356 operably coupled to the regenerator module 354. The inversion module 356 can invert the regenerated signal 355a (e.g., the signal 122) and sum the inverted copy with a copy of the digitized signal 322 in a cancelation module 360. Due to the processing time, the copy of the digitized signal 322 may be provided through a delay module 365 to provide, for example, proper phase for signal cancelation. The cancelation module 360 may correct the inverted copy of the interfering signal for gain and phase with the raw signal 310 to produce an interference free signal 370. In some embodiments, the interference free signal 370 may be processed again to further reduce any interference present by supplying the interference free signal 370 from the cancelation module 360 to the interference detector 330 or the separator module 352, as indicated by the dashed line. The interference free signal 370 may be considered a synthesized copy of the desired signal (e.g., the signal 122) or a copy of the digitized signal 322 with the interfering signal (e.g., the signal 124) canceled. The signal 122 and the signal 124 are used as primary examples herein, but each may represent multiple signals or interfering, complex modulations. In the foregoing example, the desired signal is the signal 122 and the signal 124 is the interfering signal. Thus, the signal 124 can represent multiple interfering signals together.

In some embodiments, the demodulator 300 can further have a digital to analog (D2A) converter (not shown) coupled to the cancelation module 360 and the regenerator module 354 that may convert the processed signals back into an analog signal.

Figure 4:
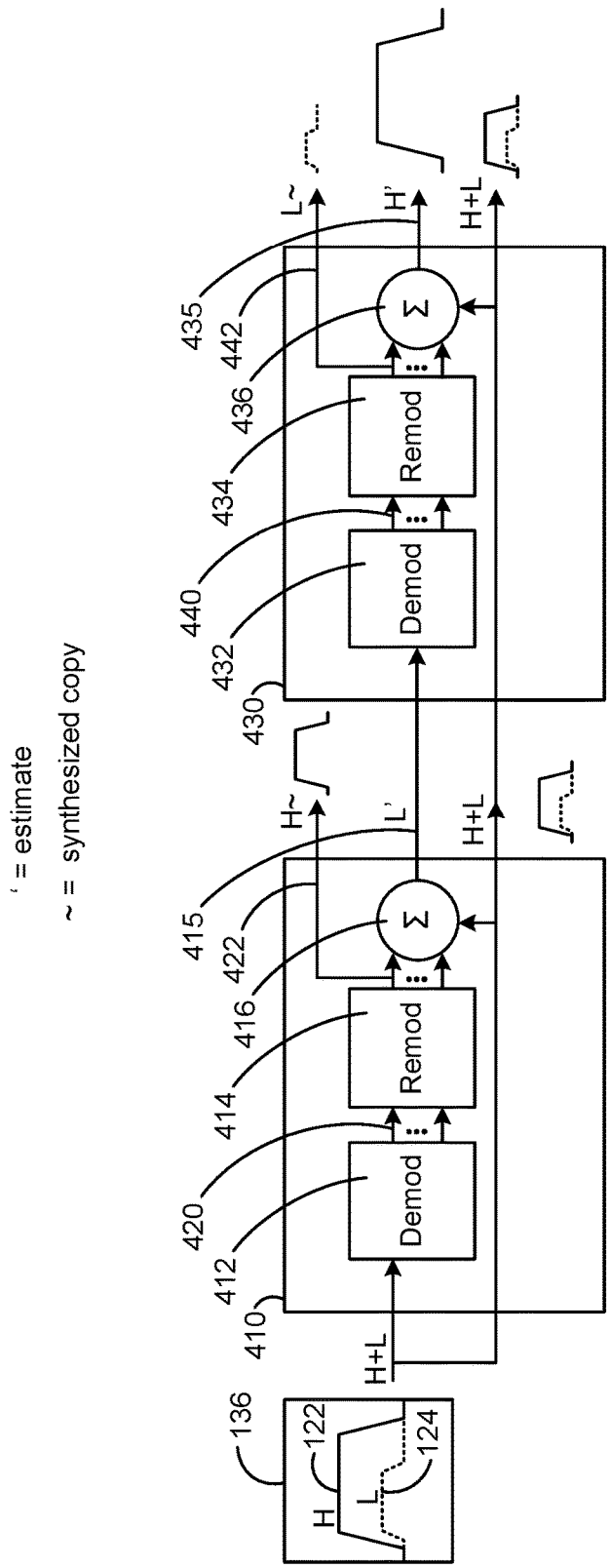
FIG. 4 is a functional block diagram illustrating an embodiment of a method for interference reduction using the demodulator of FIG. 3.

In some embodiments the regeneration of each of the constituent signals (e.g., the signal 122 and the signal 124) may be completed simultaneously or at least concurrently. Portions of the ART 350 can be used in an iterative sequence to refine multiple signals within the raw signal 310. If multiple signals of interest are present, the synthesized, or regenerated constituent signals can be fed back to the interference detector 330 for further processing. For example, if the strongest signal is regenerated first, the demodulator 300 can refine lower-power constituent signals by removing or canceling the highest power signals, and providing the residual signal (e.g., the interference free signal 370) for additional processing within the ART 350. This is described in further detail in connection with, for example, FIG. 4, FIG. 5, and FIG. 6. As described below, various configurations can be possible, routing particular versions of one or more of the regenerated signals from the regenerator module 354 back to the interference detector 330 and/or the separator module 352. These various routes are shown in dashed lines. Depending on the nature of the synthesized (regenerated) signal, the demodulator 300 can further process the regenerated signal, the residual signal FIG. 4 is a functional block diagram illustrating an embodiment of a method for interference reduction using the demodulator of FIG. 3. In general, the ART 350 can perform blind signal separation, signal synthesis, and signal demodulation of multiple signals concurrently or simultaneously. For convenience of description, the signal synthesis can be broken down into multiple stages, synthesizing an exemplary high power signal and then using the regenerated high power signal to extract, or estimate another low(er) power signal. The estimated low power signal can then be used to refine the high power signal. The stages can be repeated, or iterated, for any number of additional signals within the composite signal 136, for example.

In a first stage 410, the demodulator 300 can receive the composite signal 136. The composite signal 136 can thus also be the raw signal 310, received at the digitizing module 320, as described above.

In the first stage 410, the ART 350, for example, can receive information about the constituent signals within the signal 136 (e.g., the signals 122, 124) from the interference detector 330. The separator module 352 can then resample (e.g., oversample) the windowed signal 328, allowing the ART 350 to perform a first demodulation 412 of the one or more constituent signals using, for example, the symbol trajectory, coupled with the shaping factor, modulation, and phase offset of the various constituent signals. This can result in a first estimate or a first demodulation estimate of the signal. In some examples, such as that shown in FIG. 4, the signal 122 may be a high(est) power signal of multiple signals within the composite signal 136. Thus, in the first stage 410, the signal 122 ("H" for "high power") may be synthesized (e.g., demodulated) first, as an estimated signal H 420, because the high power provides more signal strength facilitating the signal separation. The first stage 410 can be similar to the processes implemented at the separator module 354, for example. The ART 350 can then perform a first remodulation 414 of estimated signal H 420 (e.g., signal 122) to derive the synthesized version of the signal "H~" 422. The ART 350 can then perform a cancelation 416 (at for example, the cancelation module 360), removing the synthesized signal H~422 from the composite signal 136. This can leave a residual signal that is an estimate of the low power signal ("L"), referred to herein as an estimated low power signal L' 424 (the signal 124, in this example).

The first stage 410 can then output the synthesized high power signal H~422, an estimate of the low power signal L' 424, and the composite signal 136 (e.g., a copy of the composite signal 136 can be passed through the first stage 410). These outputs can be fed to a second stage 430. The second stage 430 can receive the outputs of the first stage 410 and perform a second demodulation 432 on the estimate of the low power signal L' 415. The ART 350 can then perform a second remodulation 434 to derive a synthesized version of the low power signal L~442. The ART 350 can then further perform a cancelation 436, reducing or removing the low power signal L~strength to result in a refined estimate or refined synthesized version of the high power signal H' 435. The first stage 410 and the second stage 430 can thus be used in tandem in order to reduce interference to characterize and separate the various the constituent signals within the composite signal 136.

In some embodiments, the first stage 410 and the second stage 430 can be used as a paired set of processes within the ART 350. The first stage 410 and the second stage 430 can be repeated any number of times to further refine the synthesized high power signal H~422 and the synthesized low power signal L~, and/or any other signals present within the composite signal 136.

In one example, each of the first stage 410 and the second stage 430 can be implemented in one or more of a FPGA, ASIC, or other circuitry (not shown). The individual circuits comprising the first stage 410 and the second stage 430 can then be implemented in multiple iterations for serial processing of the one or more constituent signals, concatenating the associated circuitry. The ART 350 can implement such serial processing for the functions of, for example, the signal separator 352, the regenerator module 354, the inversion module 356, and the cancelation module 360. However, because each pair of serial processing stages is disposed in serial circuitry, this arrangement can occupy considerable physical space.

Thus, the arrangement of the demodulator 300, and more particularly the configuration of the regenerator module 354 as the regeneration support module 358 and the regenerator modem 359 can significantly reduce the amount of physical space required to separate, synthesize, demodulate, and protect one or more signals of interest. The faster processing speed of the regenerator modem 354 can provide several iterations of the demodulation-remodulation of the first stage 410 and the second stage 430 without the physical space requirements of multiple concatenated circuits for doing the same.

Figure 5:
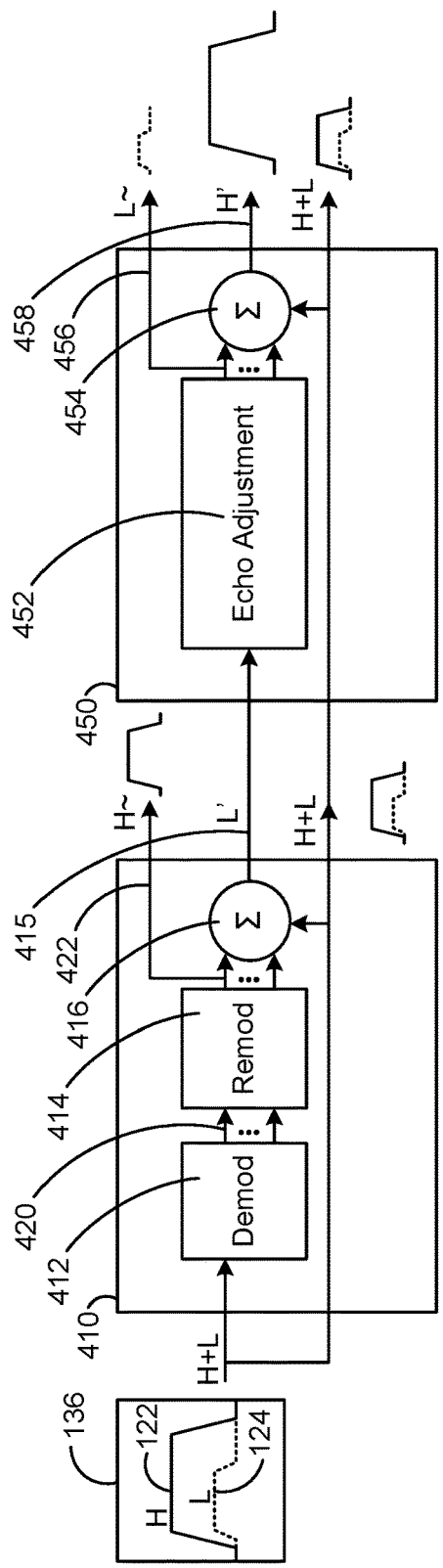
FIG. 5 is a functional block diagram illustrating another embodiment of a method for interference reduction using the demodulator of FIG. 3.

FIG. 5 is a functional block diagram illustrating another embodiment of a method for interference reduction using the demodulator of FIG. 3. In some embodiments, the regenerator modem 359 can implement the first stage 410 as described above. Then in place of, or in addition to the second stage 420, the demodulator 300 can implement an echo cancelation stage 450. The echo adjustment stage 450 can take as an input, a copy of the estimate of the low power signal L' 415 perform and perform an echo adjustment 452. IN some embodiments the echo adjustment 452 can include an adjustment in gain and/or phase, similar to echo cancelation. The output of the echo cancelation can be a synthesized version of the low power signal 456, similar to synthesized version of the low power signal L~442. The synthesized version of the low power signal 456 can be canceled 454 from the composite signal 136 to provide a refined version of the refined synthesized version of the high power signal 458, similar to refined synthesized version of the high power signal H' 435.

Figure 6:
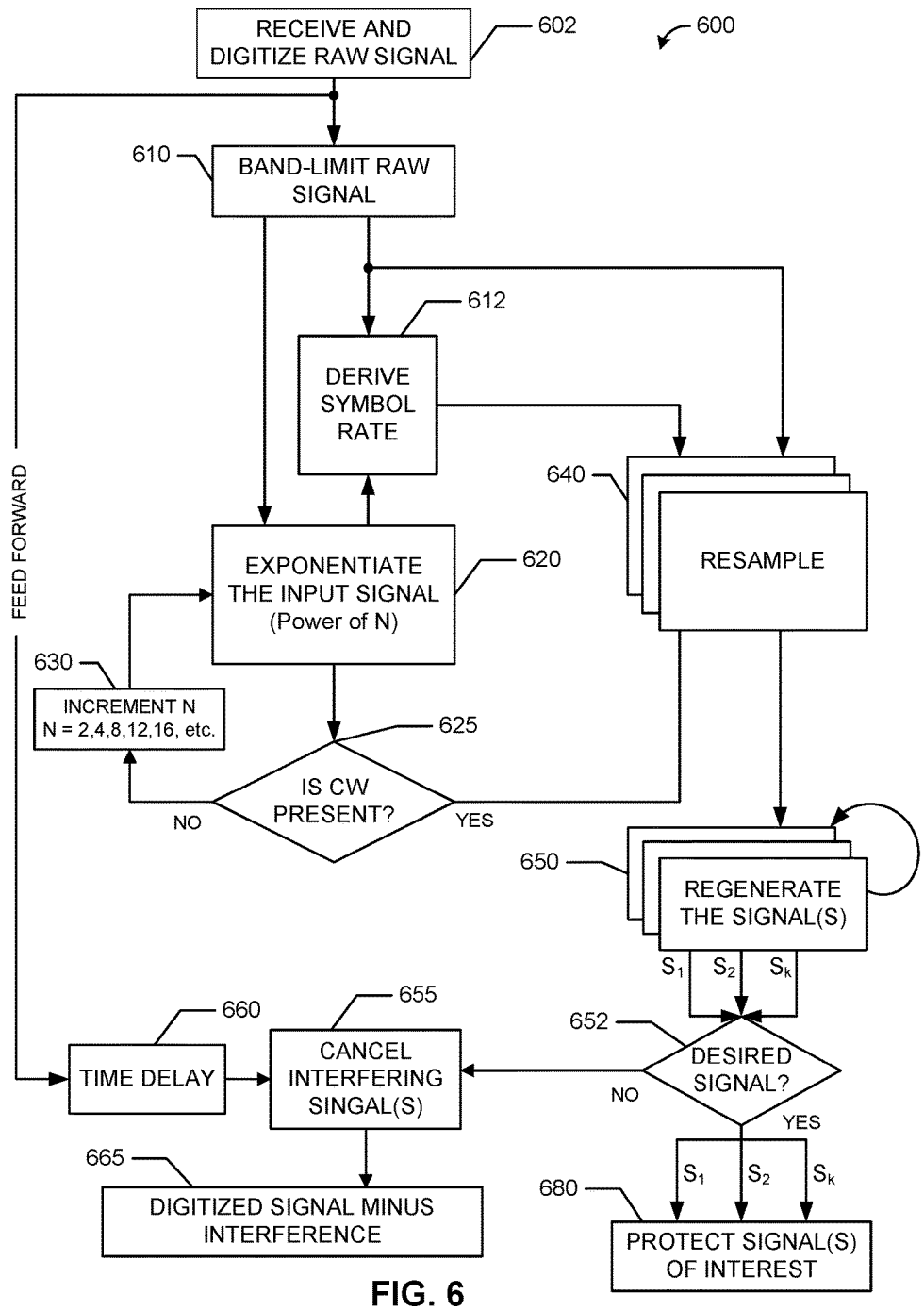
FIG. 6 is a flowchart of an embodiment of a method of signal separation using the demodulator of FIG. 3 and the methods of FIG. 4 and FIG. 5

FIG. 6 is a flowchart of an embodiment of a method of signal separation using the demodulator of FIG. 3 and the methods of FIG. 4 and FIG. 5. As shown, a method for signal separation ("method") 600 may start at block 602 with receiving the raw signal 310 (see, FIG. 3). The raw signal 310 can also be digitized by the digitizing module 320 at block 602. In some embodiments, the signal(s) of interest (e.g., the signal 122, 124) may only occupy a portion of the raw signal 310 spectrum. Additionally, the demodulation system 300 may selectively limit the amount of raw signal 310 regarded for signal processing. At block 610, the windowing module 325 can adjust the bandwidth that the demodulation system 300 regards as the bandwidth of interest. For example, the raw signal 310 may be a large swath of frequencies containing not only the signal(s) of interest (e.g., the signal 122 and the signal 124) but also various other transmissions not necessarily intended for the ground station 106 or other interfering transmissions. Accordingly, at the block 610, the windowing module 325 may band limit the raw signal 310 (e.g., the windowed signal 328, FIG. 3) to focus on the bandwidth in which the signal 122 is expected to be received. In some embodiments, both the signal 122 and the signal 124 may be signals of interest, thus the windowing module 325 can band limit the raw signal 310 to receive both signals 122, 124. In some other embodiments, the windowed signal 328 can include more than the signals 122, 124. In some embodiments, little or no information may be known at the demodulator 300 about the signal 122, the signal 124, or any other interfering signals that are received. In some cases however, at least an expected bandwidth may be known.

Due to Doppler shift over long transmission distances from the ground station 102 or the ground station 104 to the satellite 110, and then to the ground station 106, certain time delays or shifts in frequency may result. For example, the signal 124 may be expected to have a center frequency of 1.44 GHz (Gigahertz) and a bandwidth of 22 MHz (Megahertz). Such a signal (e.g., the signal 124) may be shifted in time and frequency over the long transmission path, and thus arrive at the ground station 106 as a portion of the composite signal 136 having a center frequency of 1.452 MHz and a bandwidth of 22.64 MHz as determined by the windowing module 325. The bandwidth and center frequency of the windowed signal 328 may further depend on other factors determined by, e.g., the processor 204.

Thus in some embodiments, the windowing module 325 may further adjust the bandwidth of the received portion of the spectrum (e.g., the raw signal 310) to focus on the signal 124. In another embodiment, the composite signal 136 may have one or more constituent signals (e.g., the signal 122 and the signal 124). The windowing module 325 may then adjust the bandwidth of the received raw signal 310 to encompass the all of the constituent signals (e.g., the signals 122, 124). As described below in connection with FIG. 7A, FIG. 7B, and FIG. 7C, the composite signal 136 may comprise multiple constituent signals 122, 124 overlapped in frequency.

At block 620 the interference detector 330 may exponentiate the windowed signal 328. The exponentiation process can include raising the windowed signal 328 to a power of n, or multiplying the windowed signal 328 by itself n number of times until a CW is the product of the power of n, where n is an integer. In some embodiments, the exponentiation can be completed in the time domain. The interference detector 330 can be configured to perform such an operation in small time blocks in the time domain of the windowed signal 328. In some embodiments, this may be performed by software.

At decision block 625 the interference detector 330 may determine if one or more CWs are produced by the exponentiation. If not, the method 600 may increment the value of n at block 630. The method 600 may then return to block 620 to again exponentiate the windowed signal 328 at n+2, for example. The exponentiation at block 600 may be repeated until one or more CWs are present. Each signal (e.g., signal of interest or interfering signal) present within the windowed signal 328 may present an individual CW product.

In some embodiments, multiple constituent signals within the composite signal 136 (e.g., the windowed signal 328) may yield more than one CW product at different powers of n. For example, if the signal 122 is modulated using BPSK the continuous wave may result at n=2. As another example, if the signal 124 is modulated using QPSK then the CW waveform would result from a power of n=4. In some embodiments, n is a factor of 2. The power index n then provides an indication of the modulation type: 1=CW; 2=BPSK; 4=QPSK, and on to n=m. In some embodiments m may be any integer multiple of two. Certain additional processes may be required to disambiguate between QPSK and 16QAM, for instance as both may yield a CW at n=4. This is described in more detail below.

In some embodiments, the windowed signal 328 received by the interference detector 330 may be received as a data stream of symbols in I (in-phase) and Q (quadrature) form, where I represents a symbol coordinate on a real axis and Q represents a symbol coordinate on an imaginary axis. The I and Q data may further be implemented to represent polar coordinates of a given symbol. Accordingly, a complex signal can be represented as SC=Si+Sq. The signal SC is exponentiated (e.g., raised to a power n) where n can be, for example, a multiple of two: n=2, 4, 8, 12, 16, 24, 32, etc. The value(s) of n can indicated one or more modulation types. The complex components of the signal SC, Si and Sq, can also be exponentiated to determine whether the modulation type has a constant amplitude. For example, at n=4, the modulation can be QPSK or QAM. In order to disambiguate between the two types, the interference detector 330 can produce a histogram of symbol vectors representing symbol power and phase to determine whether there are multiple power and phase states within each quadrant of I and Q. The histogram can reveal whether the modulation of SC is QPSK, 8QAM, 16QAM, or 64QAM, for example. In some embodiments, APSK (e.g., 16-APSK or 32-APSK) may be present. Such signals may be associated with Digital Video Broadcasting—Satellite—Second Generation (DVB-S2). In some other embodiments, the interference detector 330 can further distinguish MSK, GMSK, OQPSK, and 8PSK among other modulation types, such as those listed above in the description of FIG. 1.

At block 612, the interference detector 330 can also derive one or more symbol rates of the one or more constituent signals within the windowed signal 328. As noted above, the interference detector 330 can include one more adaptive equalizers configured to use the exponentiation results to refine one or more symbol rate estimates corresponding to the one or more constituent signals. The adaptive equalizers may be operated (e.g., clocked) at a multiple of the estimated symbol rate in order to refine the symbol rate estimates into actual symbol rates that can be provided to the ART 350. If at the decision block 625, the interference detector 330 determines the presence of one or more CW products, the method proceeds to block 640.

At block 640, the interference detector 330 may provide the one or more symbol rates (from block 612) and a modulation estimate based on the power factor n (from block 620) to the ART 350. The ART 350 may then resample the windowed signal 328 using the power factor n at X-times the symbol rate (from block 612). Accordingly, the ART 350 may resample, or oversample, the windowed signal 328 at a high rate to determine a symbol trajectory(ies) and refine the modulation type(s). In the presence of multiple constituent signals, the ART 350 may further determine phase offset and frequency offset between the individual constituent signals. The block 640 may occur in multiple concurrent instances, according to the number of constituent signals. For example, FIG. 6 indicates three resampling blocks 540 corresponding to the multiple signals (e.g., the signal S1, and signal S2 through signal Sk, described below).

At block 650, the ART 350 may further regenerate the constituent signals using one or more of the symbol trajectory, shaping factor, phase offset, frequency offset, bandwidth, and other available information about the constituent signals. The block 650 can include multiple iterations of the first stage 410 and the second stage 430 of the demodulation-remodulation described in connection with FIG. 5. The synthesized, or regenerated signals are labeled as signal S1, signal S2, through signal Sk. The signal Sk indicates that more than two signals up to a k-number of signals may be regenerated via multiple iterations of the first stage 410 and the second stage 430. In some embodiments the k-number of signals may be processed concurrently and thus simultaneously or concurrently demodulated.

At block 650, the various regenerated constituent signals can be demodulated (e.g., the signal S1, S2, Sk). In some embodiments, the ART 350 can independently derive each of the constituent signals and simultaneously demodulate them even in the presence of a frequency overlap. In some embodiments, the regeneration at block 650 can be iterative as described above in connection with FIG. 3 through FIG. 5. The iterations are indicated by the curved arrow at block 650. The processing can be accomplished using the ART 350, incorporating a separate circuitry for the regenerator modem 359. As described above, if, for example, the strongest signal is regenerated first, and it is not a signal of interest, it can be canceled from the digitized signal 322. The remaining signal, or residual signal, can be reprocessed by the interference detector 330 and the ART 350. This can require the multiple passes through the regenerator modem 359 described above, for example.

In another embodiment, multiple iterations of the process of the method 600 can be facilitated by the regenerator modem 359. Since the regenerator modem 359 is capable of processing data faster than data is supplied to it by the regeneration support module 358, several loops or iterations of signal regeneration are possible at, for example, block 650

At decision block 652, the processor 204 can determine whether one or more of the regenerated signals are the desired signals. Accordingly, the processor 204 may determine that the signal of interest (e.g., the signal 122) was not yet recovered by the method 600. In some embodiments this may occur because the signal of interest (e.g., the signal 122) has a low power level, or a lower power level than the regenerated signals S1:Sk. For example, the method 600 may have been able to isolate one or more constituent signals having a higher power level than the signal of interest and determine such signals are interfering signals. If one or more of the regenerated signals is not the signal of interest, at block 655 one or more inverted copies of the one or more of the regenerated interfering signals may be provided to the cancelation module 360. This process can be analogous to the cancelation 416, 436 (FIG. 4), for example. In some embodiments, if none of the regenerated signals at block 650 are the desired signal then they can be treated as interfering signals and canceled.

The cancelation module 360 may also take as an input, a copy of the windowed signal 328 that is delayed by the delay module 365 at block 660. At block 665 a residual signal that has had one or more regenerated signals (not signal(s) of interest) cancelled from it may be produced. Accordingly, the windowed signal 328 minus the canceled interfering signals at block 655 may generate the desired signal (e.g., the signal 122) at block 665. The residual signal can result from the combination of the inverted interfering signal and the digitized signal 322. The residual signal may be a version of the digitized signal 322 having at least one constituent signal (e.g., the interfering signal) canceled. In some embodiments this may be referred to as the noise floor. This may further enable the demodulator 300 to characterize the noise floor and increase the SNR of the signal of interest, the signal 122 for example.

If at decision block 652 the processor 204 determines that one or more of the regenerated and demodulated signals are desired signals, the method 500 can move to block 680. At block 680, the processor 204 may then protect the one or more desired regenerated signals. In some embodiments, the method 600 may result in any number of regenerated signals. In some embodiments, the undesired signals may be discarded or ignored. In some other embodiments, the undesired signals may be used to refine the desired signal by adaptive cancelation through demodulation-remodulation of the first stage 410 and the second stage 430, or via echo adjustment/echo cancelation described in connection with FIG. 5.

The method 600 can be iterative. Each iteration of the method 600 may provide successively more accurate regenerations of the constituent signals (e.g., the signals 122, 124). However, the processing time may be reduced, and efficiency increased using the regenerator modem 359. Accordingly, by using the interference cancelation method described above, multiple signals may be overlapped in frequency, maximizing the use of available frequency spectra.

Figure 7A:
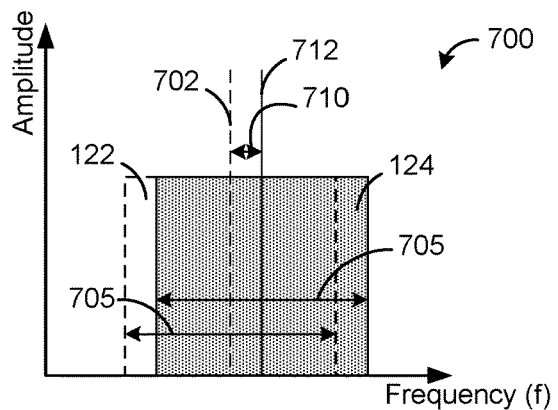
FIG. 7A is a plot of two signals overlapped in frequency that may be separated using the methods of FIG. 4, FIG. 5, and FIG. 6.
Figure 7B:
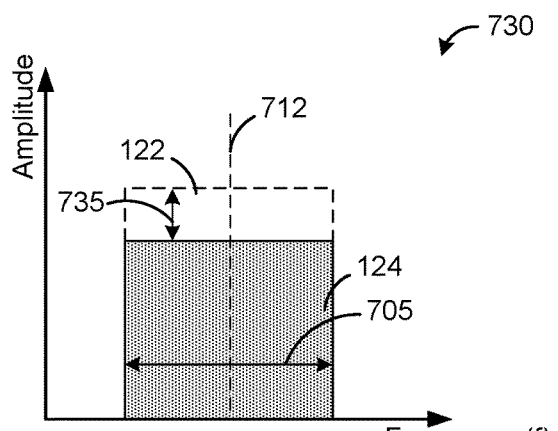
FIG. 7B is another plot of two signals overlapped in frequency that may be separated using the methods of FIG. 4, FIG. 5, and FIG. 6.
Figure 7C:
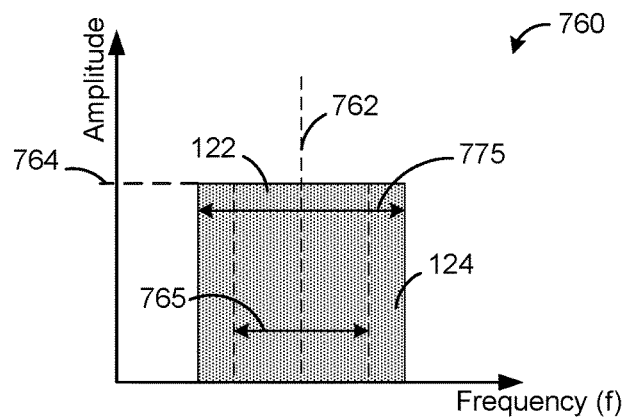
FIG. 7C is another plot of two signals overlapped in frequency that may be separated using the methods of FIG. 4, FIG. 5, and FIG. 6.

FIG. 7A, FIG. 7B, and FIG. 7C that follow are plots of possible ways that signals may be overlapped and transmitted while maintaining sufficient distinguishing qualities such that they may be separated and demodulated as described herein. By overlapping two or more signals (e.g., the signal 122 and the signal 124) in frequency, a communication link (e.g., the communication system 100) may make more efficient use of available frequency spectra and increase data throughput.

As mentioned above, the sum of two or more modulated signals 122, 124 can form a distinct modulation. In some embodiments, the combined signals may be mutually interfering. For a given degree of interference or noise contamination of a communication channel (e.g., in the communication system 100), it is possible to communicate discrete data (digital information) nearly error-free up to a computable maximum rate through the channel. Such a maximum may be computed using Shannon's theorem. As applied to overlapped frequencies as described herein, Shannon's theorem shows that a change in signal to noise ratio of the modulated signals 122, 124 is dependent upon the proposed modulation technique for each of the signals 122, 124 and their underlying required energy per bit to noise power spectral density ratio (EsNO). This value can also be expressed as signal-to-noise ratio (SNR) per bit, or as a normalized SNR measure of the individual signals 122, 124. In some embodiments, such calculations can be useful to derive a maximum overlap and optimum bandwidth or modulation type when transmitting overlapped signals. In some other embodiments, such calculations may further be useful in separation, regeneration, and demodulation methods or techniques for overlapped signals, as described herein.

FIG. 7A is a plot of two signals overlapped in frequency that may be separated using the methods of FIG. 4, FIG. 5, and FIG. 6. A plot 700 is shown with amplitude on the vertical (y) axis versus frequency (f) on the horizontal (x) axis. The plot 700 shows an embodiment of two signals such as the signal 122 (bounded by dashed lines) and the signal 124 (bounded by solid lines) that can be overlapped in frequency and demodulated by the ART 350. In an embodiment, the signal 122 and the signal 124 can have a same bandwidth 705. The signal 122 can have a center frequency 702 and the signal 124 can have a center frequency 712. A difference between the center frequencies 702, 712 may generally be referred to herein as a phase offset 710.

In an embodiment, the ART 350 may distinguish the signal 122 from the signal 124 during resampling (e.g., the blocks 650) in part due to the increased sample rate used by the separator module 352. While the signal 122 and the signal 124 are only offset slightly by the phase offset 710, the high resampling rate (e.g., X-times the symbol rate) allows the ART 350 to distinguish between multiple signals with only slight variations in center frequency, amplitude or bandwidth.

For example, the phase offset 710 can be a result of the phase shift between the signal 122 and the signal 124. Accordingly, if the signal 122 and the signal 124 are both modulated with QPSK with a 45 degree (π/4 radians) phase offset 610, the QPSK constellations of each signal 122, 124 will appear with a 45 degree shift in phase; the ART 350 can then distinguish the signal 122 from the signal 124 using the symbol trajectory and shaping factor of the signal 122 and the signal 124 to regenerate and demodulate both of the signals 122, 124. In some embodiments, the system 300 may be capable of separating, regenerating, and demodulating more than two signals at once.

FIG. 7B is another plot of two signals overlapped in frequency that may be separated using the methods of FIG. 6. A plot 730 is shown with amplitude on the vertical (y) axis versus frequency (f) on the horizontal (x) axis. The plot 730 further shows the signal 122 (bounded by dashed lines) and the signal 124 (bounded by solid lines) with the same bandwidth 605 as before. The difference between the plot 700 and the plot 730, however, is that in the plot 730, the signals 122, 124 are completely overlapped in frequency, both having a center frequency 732. The plot 730 also shows a difference in amplitude 735. The difference in amplitude 735 indicates that while the signal 122 and the signal 124 are share the same bandwidth 705 and the same center frequency 732, the difference in amplitude 735 (e.g., a power level or received signal strength) can be sufficient to distinguish the signals 122, 124 using the method 600 disclosed herein. Accordingly the ART 350 may separate, regenerate, and demodulate two or more frequencies with the same bandwidth 705 and the same center frequency 732 when there is a difference in amplitude 735.

FIG. 7C is another plot of two signals overlapped in frequency that may be separated using the methods of FIG. 6. A plot 760 is shown with amplitude on the vertical (y) axis versus frequency (f) on the horizontal (x) axis. The plot 760 further shows the signal 122 (bounded by dashed lines) and the signal 124 (bounded by solid lines) having a same center frequency 762 and the same amplitude 764. The plot 760 further shows the signal 122 having a bandwidth 765 and the signal 124 having a bandwidth 775. The difference in bandwidth between the signal 122 and the signal 124 can be sufficient to allow the ART 350 to separate, regenerate, and demodulate the signals 122, 124.

Figure 8:
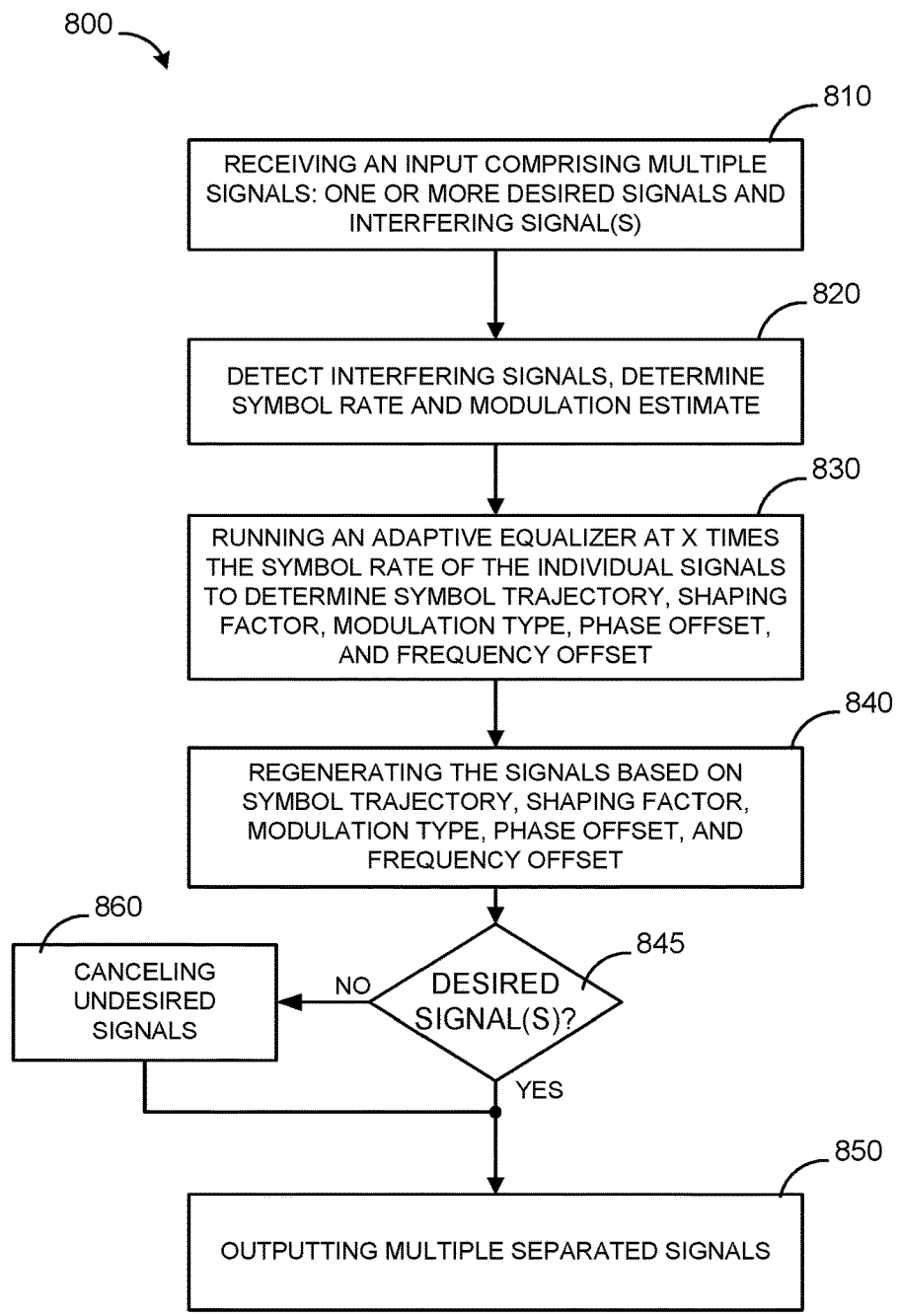
FIG. 8 is a flowchart of a method of separation and demodulation of overlapped signals.

FIG. 8 is a flowchart of a method of separation and demodulation of overlapped signals using the system of FIG. 3. A method 800 starts at block 810 when a ground station (e.g., the ground station 106 of FIG. 1) receives an input (e.g., the raw signal 310) having two or more constituent signals. In some embodiments, the two or more constituent signals (e.g., the signal 122 and the signal 124) may be signals of interest. In some other embodiments the input may have one or more interfering signals.

At block 820 the demodulator 300 may detect certain interfering signals within a portion of the input (e.g., the windowed signal 328). The interference detector 330 can derive a symbol rate for the two or more constituent signals 122, 124 within the windowed signal 328. The interference detector 330 can also derive a modulation estimate through exponentiation of the windowed signal 328 (e.g., power of n). The CW waveforms that result from the exponentiation (e.g., the power of n) may be used to determine phase offset, frequency offset, bandwidth, and time delay.

At block 830, one or more adaptive equalizers can be applied to the windowed signal 328 at X times the symbol rate of the individual constituent signals 122, 124 to determine the symbol trajectory, shaping factor, phase offset, frequency offset, and modulation type of the signal 122 and the signal 124.

At block 840, the demodulator 300 and more specifically the ART 350 may regenerate or synthesize the constituent signals (e.g., the signal 122 and the signal 124) based on one or more of the bandwidth, symbol trajectory, shaping factor, modulation type, phase offset, and frequency offset. The regenerator module 354 can use the regenerator modem 359 to process the separated signals at a "faster than real time" rate in order to iteratively refine the synthesized or regenerated constituent signals as noted above in connection with FIG. 4, FIG. 5, and FIG. 6. The ART 350 can consume, or take in sequential portions (e.g., first portion, second portion, third portion, etc.) at a first data rate. Each portion can represent snapshots of the signal (e.g., the digitized signal 322) in time. Each portion can be delivered sequentially to the regenerator module 354 in addition to the signal information derived by the signal separator 352. The regenerator modem 359 can process the portions of the digitized signal 322 at a second rate that is faster than the first rate. Thus the iterative demodulation/remodulation associated with FIG. 4 and FIG. 5, for example, can be performed multiple times on the first portion in the time required for the demodulator 300 to receive a subsequent, second portion of the incoming signals. This can reduce the time and amount of circuitry required to conduct iterative signal enhancement and interference mitigation.

At decision block 845, the processor 204 can determined if the regenerated signals are signals of interest. If the regenerated signals are signals of interest, the method 800 can proceed to block 850.

At block 850, the demodulator 300 can demodulate each of the constituent signals. In some embodiments, the constituent signals can be demodulated simultaneously. In some other embodiments, the adaptive regeneration as disclosed in the method 800 can occur independent of time delay. Due to the adaptive equalization and the resampling at X-times the symbol rate, a more accurate estimation of the constituent signals can be generated at a faster rate than by interference cancelation alone. In some embodiments, the steps indicated in block 810, block 820, and block 830 can be executed in software. In some embodiments, the steps indicated in block 840 and block 850 can be executed in firmware.

If at decision block 845 the signals are not signals of interest, the regenerated signals (e.g., the block 840) can be deemed interfering signals. Accordingly, at block 860, the demodulator 300 (FIG. 3) can cancel the interfering signals from the windowed signal 328. The method 800 can the proceed to block 850 and outputting at least one signal of interest.

In some embodiments, the method 800 can be repeated or iterated as needed to demodulate or separate constituent signals. For example, such iterations can be accomplished at a rate that is "faster than real time" by incorporating the regenerator model 359. As described above, the regenerator modem 359 can process the data at a rate that may be several multiples of the rate at which the data is consumed at the ART 350. The method 800 can be combined with the method 400 and the method 500 to effect additional interference cancelation by canceling one or more constituent signals from a time delayed copy of the raw signal to determine a residual signal (e.g., block 565 of FIG. 5) and re-process the residual signal using the method 700.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods described herein may be implemented in hardware, software, firmware, or any combination thereof. Such methods may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the methods may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques and methods additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry, as described in connection with FIG. 2. Such a processor may be configured to perform any of the methods and functions described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the methods described herein.

Although embodiments of the disclosure are described above for particular embodiment, many variations are possible. For example, the numbers of various components may be increased or decreased, modules and steps that determine a supply voltage may be modified to determine a frequency, another system parameter, or a combination of parameters. Additionally, features of the various embodiments may be combined in combinations that differ from those described above.

Those of skill will appreciate that the various illustrative blocks and modules described in connection with the embodiment disclosed herein can be implemented in various forms. Some blocks and modules have been described above generally in terms of their functionality. How such functionality is implemented depends upon the design constraints imposed on an overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block or distributed across to modules or blocks without departing from the disclosure.

The above description of the disclosed embodiment is provided to enable any person skilled in the art to make or use the invention. Various modifications to these embodiments will be readily apparent to those skilled in the art, and the generic principles described herein can be applied to other embodiment without departing from the spirit or scope of the disclosure. Thus, it is to be understood that the description and drawings presented herein represent a presently preferred implementation of the invention and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method for separating a first signal from a second signal of a plurality of constituent signals within a composite signal, the method comprising:

receiving, at a first clock rate, a first portion of the composite signal spanning a first period of time;

exponentiating the first portion to detect the first signal and the second signal within the composite signal and determine,
a first modulation estimate of the first signal,
a second modulation estimate of the second signal, and
at least one symbol rate;
resampling the first portion based on the first modulation estimate and the second modulation estimate at x-times the at least one symbol rate to determine at least one symbol trajectory, at least one modulation type, and offset information related to an offset between the first signal and the second signal, x being an integer greater than zero;
determining a synthesized first signal and a synthesized second signal representing the first signal and the second signal within the first period of time at a second clock rate, the second clock rate being a multiple of the first clock rate, wherein the determining is performed at least partially off-chip.

2. The method of claim 1 wherein the determining comprises:
generating a first demodulation estimate based on the resampling;
remodulating the first demodulation estimate based on the at least one modulation type to form the synthesized first signal; and
canceling the synthesized first signal from the first portion to form a first residual signal including an estimate of the second signal.

3. The method of claim 2 further comprising:
demodulating the first residual signal to form a second demodulation estimate;
remodulating the second demodulation estimate to form the synthesized second signal; and
canceling the synthesized second signal from the first portion to form a first refined synthesized first signal.

4. The method of claim 3 further comprising repeating the demodulating and the remodulating to form a refined synthesized second signal and a second refined synthesized first signal, at the second clock rate.

5. The method of claim 3 further comprising performing echo adjustment on the first residual signal to form the synthesized second signal.

6. The method of claim 1 further comprising:
receiving, at the first clock rate, a second portion of the composite signal spanning a second period of time following the first period of time; and
repeating the exponentiating, the resampling, and the determining on the second portion.

7. The method of claim 1 wherein the determining is performed in part by a regenerator modem located off-chip.

8. A device for separating a first signal from a second signal of a plurality of constituent signals within a composite signal, the device comprising:
a receiver operable to receive, at a first clock rate, a first portion of the composite signal spanning a first period of time;
one or more processors coupled to the receiver operable to, exponentiate the first portion to detect the first signal and the second signal within the composite signal and determine,
a first modulation estimate of the first signal,
a second modulation estimate of the second signal, and
at least one symbol rate; and
a regenerator modem disposed off-chip and configured to, in conjunction with the one or more processors,
resample the first portion based on the first modulation estimate and the second modulation estimate at x-times the at least one symbol rate to determine at least one symbol trajectory, at least one modulation type, and offset information between the first signal and the second signal, x being an integer greater than zero; and
determine a synthesized first signal and a synthesized second signal representing the first signal and the second signal within the first period of time at a second clock rate, the second clock rate being a multiple of the first clock rate.

9. The device of claim 8, wherein the regenerator modem being further operable to:
generate a first demodulation estimate based at least in part on the symbol trajectory;
remodulate the first demodulation estimate based on the at least one modulation type to form the synthesized first signal,
cancel the synthesized first signal from the first portion to form a first residual signal including an estimate of the second signal, at the second clock rate.

10. The device of claim 9, wherein the regenerator model is further configured to
demodulate the first residual signal to form a second demodulation estimate, and
remodulate the second demodulation estimate to form the synthesized second signal, and
wherein the one or more processors is further configured to cancel the refined estimated second signal from the first portion to form the synthesized first signal.

11. The device of claim 10 wherein the one or more processors is further configured to repeat the demodulating and the remodulating to form a refined synthesized second signal and a second refined synthesized first signal, at the second clock rate.

12. The device of claim 10 further comprising performing echo adjustment on the first residual signal to form the synthesized second signal.

13. The device of claim 8 further comprising:
receiving, at the first clock rate, a second portion of the composite signal spanning a second period of time following the first period of time; and
repeating the exponentiating, the resampling, and the determining on the second portion.

14. An apparatus for separating a first signal from a second signal of a plurality of constituent signals within a composite signal, the apparatus comprising:
means for receiving, at a first clock rate, a first portion of the composite signal spanning a first period of time;
means for exponentiating the first portion to detect the first signal and the second signal within the composite signal and determine,
a first modulation estimate of the first signal,
a second modulation estimate of the second signal, and
at least one symbol rate;
means for resampling the first portion based on the first modulation estimate and the second modulation estimate at x-times the at least one symbol rate to determine at least one symbol trajectory, at least one modulation type, and offset information between the first signal and the second signal, x being an integer greater than zero;
means for determining a synthesized first signal and a synthesized second signal representing the first signal and the second signal within the first period of time at a second clock rate, the second clock rate being a multiple of the first clock rate, wherein the means for determining is performed at least partially off-chip.

15. The apparatus of claim 14 wherein the means for determining comprises:
   means for generating a first demodulation estimate based on the resampling;
   means for remodulating the first demodulation estimate based on the at least one modulation type to form the synthesized first signal; and
   means for canceling the synthesized first signal from the first portion to form a first residual signal including an estimate of the second signal.

16. The apparatus of claim 15 further comprising:
   means for demodulating the first residual signal to form a second demodulation estimate;
   means for remodulating the second demodulation estimate to form the synthesized second signal; and
   means for canceling the synthesized second signal from the first portion to form a first refined synthesized first signal.

17. The apparatus of claim 16 further comprising means for repeating the demodulating and the remodulating to form a refined synthesized second signal and a second refined synthesized first signal, at the second clock rate.

18. The apparatus of claim 16 further comprising means for performing echo adjustment on the first residual signal to form the synthesized second signal.

19. The apparatus of claim 14 further comprising:
   means for receiving, at the first clock rate, a second portion of the composite signal spanning a second period of time following the first period of time; and
   means for repeating the exponentiating, the resampling, and the determining on the second portion.

20. The apparatus of claim 16 wherein the means for determining comprises a regenerator modem located off-chip.

* * * * *